US009903053B2

(12) United States Patent
Kawakami

(10) Patent No.: US 9,903,053 B2
(45) Date of Patent: Feb. 27, 2018

(54) FIBERS FOR REINFORCING CURED ARTICLE AND CURED ARTICLE USING SAME

(75) Inventor: Shigeki Kawakami, Hyogo (JP)

(73) Assignees: DAIWABO HOLDINGS CO., LTD., Osaka (JP); DAIWABO POLYTEC CO., LTD., Osaka (JP)

(*) Notice: Subject to any disclaimer, the term of this patent is extended or adjusted under 35 U.S.C. 154(b) by 424 days.

(21) Appl. No.: 14/007,255

(22) PCT Filed: Mar. 30, 2012

(86) PCT No.: PCT/JP2012/058575
§ 371 (c)(1),
(2), (4) Date: Sep. 24, 2013

(87) PCT Pub. No.: WO2012/133763
PCT Pub. Date: Oct. 4, 2012

(65) Prior Publication Data
US 2014/0011030 A1    Jan. 9, 2014

(30) Foreign Application Priority Data

Mar. 31, 2011    (JP) .................................. 2011-080328

(51) Int. Cl.
D02G 3/34    (2006.01)
C04B 20/00    (2006.01)
(Continued)

(52) U.S. Cl.
CPC ............... *D02G 3/34* (2013.01); *C04B 16/06* (2013.01); *C04B 16/0633* (2013.01);
(Continued)

(58) Field of Classification Search
CPC . C04B 20/0068; C04B 20/0008; E04C 5/073; Y10T 428/1978; Y10T 428/2967
(Continued)

(56) References Cited

U.S. PATENT DOCUMENTS 4,306,911 A * 12/1981 Gordon ............... C04B 20/0052
106/644
5,057,368 A * 10/1991 Largman ................ D01D 5/253
264/177.13
(Continued)

FOREIGN PATENT DOCUMENTS

JP    01-168916    7/1989
JP    01168916 A *  7/1989
(Continued)

OTHER PUBLICATIONS

Machine translation of JP01168916a.*

Primary Examiner — Vincent A Tatesure
(74) Attorney, Agent, or Firm — Hamre, Schumann, Mueller & Larson, P.C.

(57) ABSTRACT

The present invention provides cured article reinforcing fibers having a shape advantageous in physically bonding the fibers to a hardening material or bringing the fibers into engagement with the hardening material, and also provides a cured article using the fibers. The cured article reinforcing fiber of the present invention has a multilobal cross section with three or more projections. At least one of the projections has a substantially curved end part, and a base part situated toward the center of the fiber has a width smaller than the largest width of the end part. Thus, the fiber particularly has high bending strength. Further, the cured article of the present invention includes a mixture of the cured article reinforcing fiber and a hardening material, and the hardening material has been cured.

11 Claims, 2 Drawing Sheets

(51) Int. Cl.
*D01D 5/253* (2006.01)
*D02G 3/36* (2006.01)
*E04C 5/07* (2006.01)
*C04B 16/06* (2006.01)
*D01F 6/06* (2006.01)

(52) U.S. Cl.
CPC ......... C04B 20/0068 (2013.01); D01D 5/253 (2013.01); D02G 3/36 (2013.01); E04C 5/073 (2013.01); *D01F 6/06* (2013.01); *Y10T 428/2967* (2015.01); *Y10T 428/2978* (2015.01)

(58) Field of Classification Search
USPC .................................................. 428/394, 400
See application file for complete search history.

(56) References Cited

U.S. PATENT DOCUMENTS 7,883,772 B2 * 2/2011 Pourdeyhimi ............ B32B 7/02
428/364
2006/0078729 A1 4/2006 Yabuki et al.

FOREIGN PATENT DOCUMENTS

| JP | 06-219797 | 8/1994 |
| JP | 2835806 | 10/1998 |
| JP | 2004-168643 | 6/2004 |
| JP | 2005-220498 | 8/2005 |
| JP | 4358645 | 8/2009 |
| JP | 2011-032129 | 2/2011 |

* cited by examiner

US 9,903,053 B2

FIBERS FOR REINFORCING CURED ARTICLE AND CURED ARTICLE USING SAME

TECHNICAL FIELD

The present invention relates to fibers for reinforcing a cured article for use in reinforcing various hardening materials, in particular, hydraulic materials such as concrete and mortar.

BACKGROUND ART

Short fibers made of a thermoplastic resin, such as a polypropylene resin, and having a fiber length of about 1 to 20 mm are used commonly as reinforcing fibers for reinforcing various hardening materials, in particular, hydraulic materials such as concrete and mortar. In order to make use of their reinforcing abilities, the reinforcing fibers need to be difficult to remove from a material forming a cured article. For this reason, it has been proposed, for example, to mix the polypropylene resin with other resin to improve the fibers' affinity for the material forming a cured article or to form the fibers such that they have an oddly shaped cross section to enhance physical bonding between the fibers and cement.

For example, Patent Document 1 discloses cement reinforcing polypropylene fibers having a fiber strength of 6 g/denier or more. The fibers are highly crystalline polypropylene fibers having a Q-value of less than 5, a boiling n-heptane insoluble matter (HI) of 97<HI<100, and an isotactic pentad fraction (IPF) of 94≤IPF<100. A calcium carbonate fine powder is blended into at least a polypropylene resin that forms the surface layer of the fibers, and alkali metal salt of alkyl phosphate is adhered onto the fiber surface. Further, Patent Document 2 discloses cement reinforcing fibers having a cross section with three to six projections. An end of each projection has unevenness along the fiber length direction.

PRIOR ART DOCUMENTS

Patent Documents

Patent Document 1: JP 2835806 (B)
Patent Document 2: JP 4358645 (B)

DISCLOSURE OF THE INVENTION

Problem to be Solved by the Invention

The cement reinforcing fibers of Patent Document 1 have high strength because the polypropylene has a narrow molecular weight distribution and high stereoregularity. Thus, the fibers are formed to be resistant to physical external pressure to prevent their deformation, breakup, or strength deterioration in order to reinforce a cement-formed article. Furthermore, since a calcium carbonate fine powder is blended into the resin that forms most of the fiber surface, calcium ions in the fine powder and at least some of alkali metal salt of alkyl phosphate adhered onto the fiber surface form ionic bonds, changing the alkali metal salt of alkyl phosphate fixed to the fiber surface into a compound hardly soluble in water. This improves the dispersibility of the fibers in cement slurry. However, simply improving the fibers' affinity for cement by chemical bonding as in Patent Document 1 may not provide sufficient reinforcing effects on a cured article.

Further, in order to prevent the removal of the fibers from cured cement, the cement reinforcing fibers of Patent Document 2 have a cross section with three to six projections to increase the contact area with cement, and an end of each projection has unevenness in the length direction to enhance physical bonding to the cement. However, the cement reinforcing fibers of Patent Document 2 require a process of giving unevenness to projecting ends in the length direction, i.e., on the side of each fiber, resulting in a complicated process and cost increase. Further, the only disclosed cement reinforcing fibers with such a shape are thick fibers with a single fiber fineness of 100 to 10000 dtex. In addition, they are not yet in actual use and have limited use.

With the foregoing in mind, it is an object of the present invention to provide cured article reinforcing fibers having a shape advantageous in physically bonding the fibers to a hardening material or in bringing the fibers into engagement with a hardening material, and a cured article using the fibers.

Means for Solving Problem

The cured article reinforcing fiber of the present invention has a multilobal cross section with three or more projections. At least one of the projections has a substantially curved end part, and a base part situated toward the center of the fiber has a width smaller than the largest width of the end part.

The cured article of the present invention includes a mixture of the cured article reinforcing fiber and a hardening material, and the hardening material has been cured.

Effects of the Invention

Since the cured article reinforcing fibers of the present invention have a certain shape, it is possible to bond a hardening material to or bring a hardening material into engagement with the fiber surface. The cured article reinforcing fibers particularly have high bending strength.

Since the cured article of the present invention includes the cured article reinforcing fibers and a hardening material, for example, a hydraulic hardening material such as concrete, mortar, a cement paste or the like that is cured by hydration reaction, it particularly has high bending strength.

DESCRIPTION OF THE INVENTION

Figure 1:
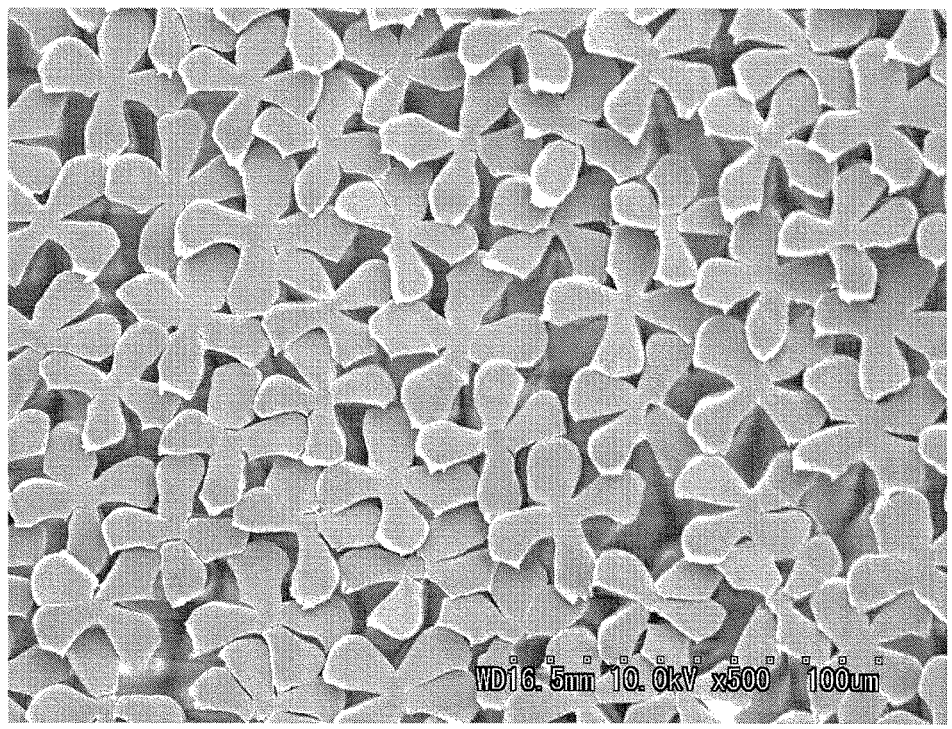
FIG. 1 is an SEM (Scanning Electron Microscope) image (×500) showing fiber cross sections of one example (Example 3) of the cured article reinforcing fibers of the present invention.
Figure 2:
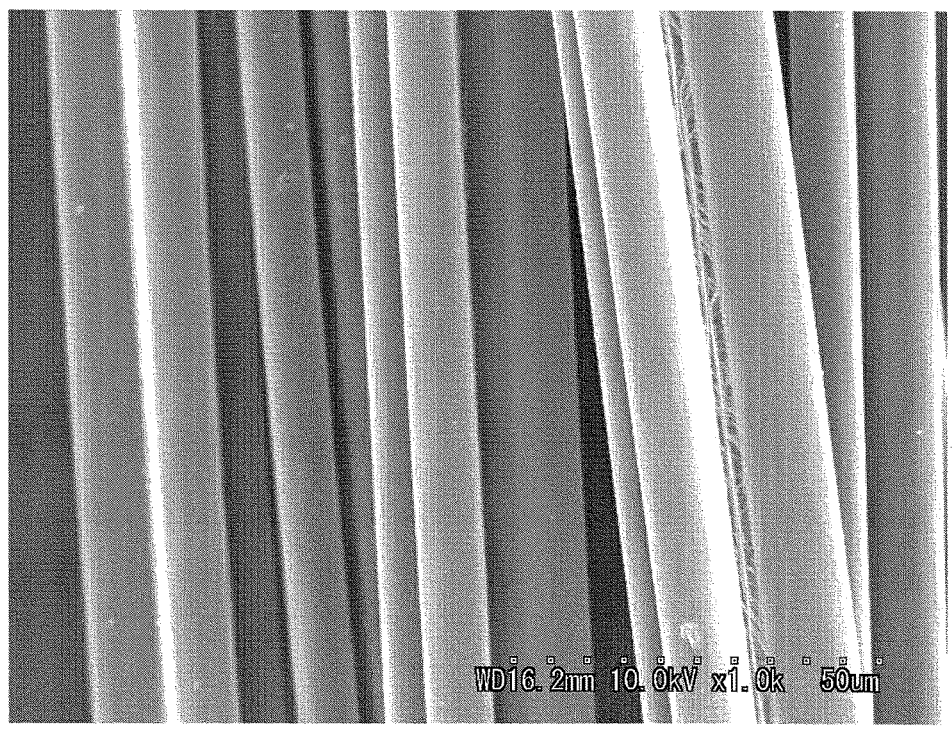
FIG. 2 is an SEM (Scanning Electron Microscope) image (×1000) showing a fiber side surface of one example (Example 3) of the cured article reinforcing fibers of the present invention.
Figure 3:
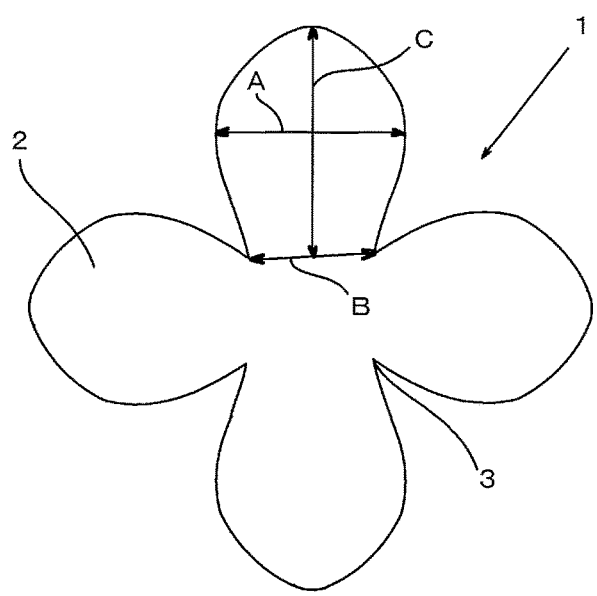
FIG. 3 is a diagram for explaining how to determine A, B and C of the cured article reinforcing fibers of the present invention.
Figure 4:
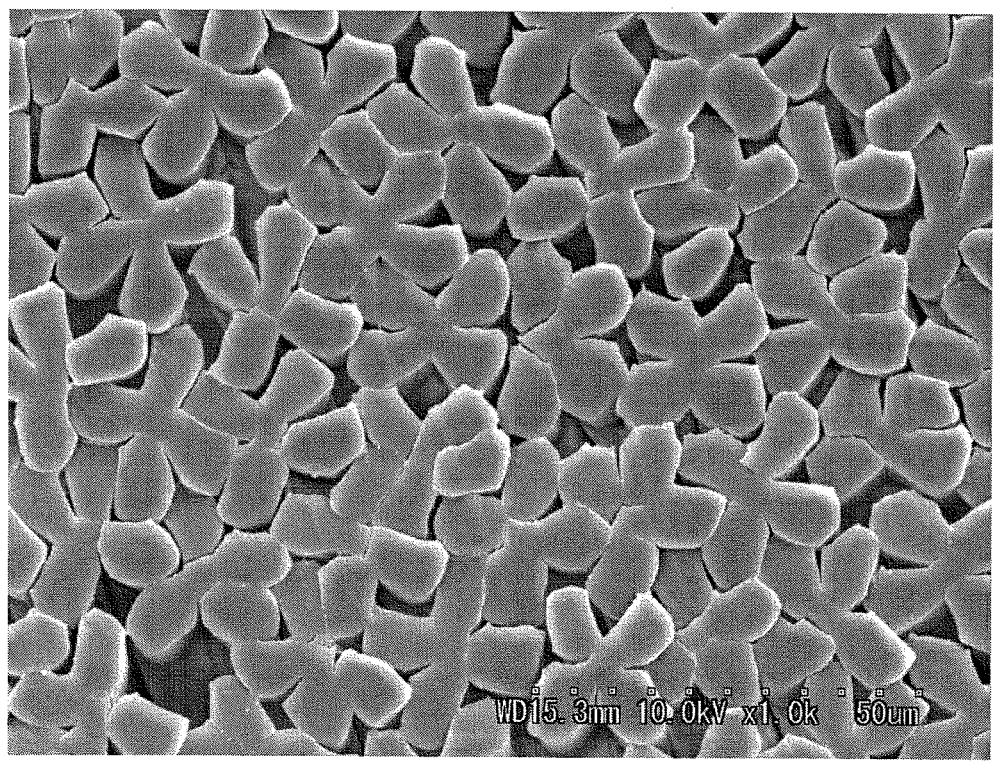
FIG. 4 is an SEM (Scanning Electron Microscope) image (×1000) showing fiber cross sections of one example (Example 5) of the cured article reinforcing fibers of the present invention.

The cured article reinforcing fibers of the present invention will be described with reference to FIG. 3. The cured article reinforcing fiber 1 of the present invention has a multilobal cross section with three or more projections 2. At least one of the projections 2 has a substantially curved end part, and a base part situated toward the center of the fiber has a width smaller than the largest width of the end part. The number of the projections 2 is preferably 3 to 16, more preferably 3 to 8, and still more preferably 4 to 6. This is because the surface area that comes into contact with a hardening material can be increased, and spaces where the hardening material enters can be secured. The multilobal projections 2 of the present invention are in such a form that they can easily deform, or become fibrilized or separated from the base. Thus, when a hardening material, such as cement, is mixed with the fibers, the hardening material is bonded to or comes into engagement with a portion between adjacent projections of the fibers, i.e., constricted portion 3. Thus, the fibers are highly effective in reinforcing a cured article. When the fibers have too many projections, it may be difficult to secure the spaces where a hardening material enters. Therefore, the fiber cross section preferably has two or more projections with the shape as described above.

At least one of the projections 2 of the cured article reinforcing fiber has a substantially curved end part, and a base part situated toward the center of the fiber has a width smaller than the largest width of the end part. Due to having such a shape, the projections can deform easily from the base, which makes it easier for a hardening material to enter the constricted portions. In the present invention, the largest width of the end part of one projection 2 is indicated by the letter A in FIG. 3. Specifically, the largest width refers to the length of the longest perpendicular line to a line connecting the center of the fiber with the end part of the projection 2, the perpendicular line being extended toward the outline of the projection 2. The width of the base part of the projection 2 is indicated by the letter B in FIG. 3, and it specifically refers to the length between both end points of the base part of each of adjacent projections. In each projection 2, the ratio between the largest width A of the end part and the width B of the base part (A/B) is preferably 1 to 5, more preferably 1.2 to 2.7, still more preferably 1.3 to 2.4, and even more preferably 1.3 to 2.0. When A/B is in these ranges, the cured article reinforcing effect tends to increase. The widths A and B can be determined by magnifying a fiber cross section of a fiber bundle by an electron microscope, and taking an average of 10 given fibers.

The largest width A of the end part of each projection 2 is preferably 3 to 20 μm, more preferably 4 to 15 μm, and still more preferably 5 to 10 μm. When the largest width A is in these ranges, a hardening material easily can enter each constricted portion 3 formed between the projections.

The width B of the base part of each projection 2 is preferably 0.5 to 20 μm, more preferably 1 to 10 μm, and still more preferably 3 to 7 μm. When the width B is in these ranges, it becomes easier for a hardening material to be bonded to or come into engagement with each constricted portion 3 formed between the projections. Moreover, when the width B is in the above ranges, the projections tend to be peeled away, fibrilized or separated easily from around the base by shearing force at the time of mixing the fibers with the hardening material.

The length C of each projection 2 (the distance between the center of the base part and the tip of each projection) is preferably 3 to 50 μm, more preferably 4 to 25 μm, and still more preferably 5 to 15 μm. When the projection length C is less than 3 μm, the projections 2 do not deform easily from the base. When the projection length C is larger than 50 μm, a hardening material may be bonded to or come into engagement with each constricted portion 3 formed between the projections insufficiently. The length C of each projection can be determined by magnifying a fiber cross section of a fiber bundle by an electron microscope and taking an average of 10 given fibers.

The ratio between the projection length C and the width B of the base part (C/B) is preferably 1 to 4, more preferably 1.1 to 3, still more preferably 1.2 to 2.8, and even more preferably 1.2 to 2.5. When C/B is in these ranges, the projections tend to deform easily from the base, thereby enhancing the cured article reinforcing effect.

The projections may be either continuous or discontinuous in the fiber length direction (on the fiber side surface). However, taking into consideration the production process, it is preferable that the projections are continuous on the fiber side surface.

It is preferable that the distance between adjacent projections is random due to deformations of the projections from the base part. When the fibers have such easily deformable projections and the distance between adjacent projection is random, hardening materials and fillers of various sizes can be taken into portions between adjacent projections, i.e., into the constricted portions, allowing them to be bonded to or come into engagement with the constricted portions. It is preferable that the largest distance between adjacent projections (the largest width of each constricted portion) is random in the range of 1 to 20 μm. The cured article reinforcing fibers of the present invention may be fibers having such a random shape (indeterminate shape) or fibers having a certain multilobal cross section before being mixed with a hardening material but become randomly shaped (indeterminate shape) due to deformations of the projections from the base when being mixed with the hardening material.

It is preferable that the base part of each projection becomes partially peeled away or the projections become fibrilized from the base part. When the base parts become peeled away or fibrilized, the contact area with a hardening material increases, and the bonding to or engagement with the hardening material tends to improve. It should be noted, however, that excessive peeling or fibrilization of the base parts leads to a decline in fiber strength. Thus, one fiber suitably has one to two peeled or fibrilized base parts. It is preferable that such fibers make up 30% or less of a fiber aggregate.

A thermoplastic resin(s) used in the cured article reinforcing fibers of the present invention may be selected appropriately from thermoplastic resins generally used in the production of fibers. Specifically, one or more resins may be selected from the group consisting of polyolefin resins such as polyethylene, polypropylene, polybutene-1, polymethylpentene, an ethylene-propylene copolymer, an ethylene-vinyl alcohol copolymer, an ethylene-vinyl acetate copolymer, an ethylene-methacrylic acid copolymer, an ethylene-acrylic acid copolymer, an ethylene-methyl methacrylate copolymer, and an ethylene-methylacrylate copolymer; aromatic polyester resins such as polyethylene terephthalate, polytrimethylene terephthalate, polybutylene terephthalate, and polyethylene naphthalate; aliphatic polyester resins such as polylactic acid, polyethylene succinate, and polybutylene succinate; polyamide resins such as nylon 6 and nylon 66; polycarbonate resins; polyoxymethylene (polyacetal) resins; polyketone resins; polystyrene resins; vinylon resins; and acrylic resins. In particular, polypropylene, polymethylpentene, or a mixture of polypropylene and polymethylpentene is preferred because they have high heat and alkali resistance.

The polypropylene is not particularly limited. However, polypropylene resins having an isotactic pentad fraction (IPF: mol %) of preferably 90% or more, more preferably 93% or more, and still more preferably 94% or more can be used. This is because high strength fibers can be obtained from these resins due to their stereoregularity. IPF can be determined by measuring the n-heptane insoluble matter in accordance with "Macromolecular" (vol. 6, 925 (1973) and vol. 8, 687 (1975)).

The polypropylene is not particularly limited but it is preferable to use those having a Q-value (Mw/Mn) of less than 6. Such resins have high stretchability, so that high strength fibers can be obtained. The Q-value is more preferably less than 5, and still more preferably 4 or less.

The cured article reinforcing fibers of the present invention may be composite fibers formed of two or more thermoplastic resins. Specifically, the cured article reinforcing fibers may be core-sheath composite fibers, concentric core-sheath composite fibers, side-by-side type composite fibers, splittable composite fibers, or sea-island type composite fibers. For example, when the cured article reinforcing fibers are core-sheath composite fibers, the fibers may have a multilobal outline but the core component of the fibers may be circular or irregularly shaped. When the core component is irregularly shaped, it is preferable that the core component has a shape substantially similar to the outline. Two or more components of the fibers may be selected from the thermoplastic resins listed above. It is preferable that both of the components, for example, the sheath component and the core component are polyolefin resins, and it is more preferable that they are polypropylene, polymethyl pentene, or a mixture of polypropylene and polymethyl pentene.

The fineness of the cured article reinforcing fibers of the present invention is not particularly limited but it is preferably 0.5 to 30 dtex, more preferably 0.8 to 5 dtex, and still more preferably 1 to 3 dtex. When the fineness is larger than 30 dtex, the take-up speed in the spinning process declines, so that the workability during the spinning process or the drawing process tends to deteriorate. When the fineness is less than 0.5 dtex, the spinnability or drawability tends to deteriorate.

The cured article reinforcing fibers of the present invention have a strength (single fiber strength) of preferably 5 cN/dtex or more, and more preferably 7 cN/dtex or more, the strength being measured in accordance with JIS L 1015. It should be noted that an upper limit to the strength is preferably 20 cN/dtex. When the strength is in these ranges, the bending strength of the cured article improves, and a fiber ball is less likely to be formed when mixing the fibers with a hardening material.

The cured article reinforcing fibers of the present invention have a single fiber elongation of preferably 15 to 60%, and more preferably 20 to 40%, the single fiber elongation being measured in accordance with JIS L 1015. When the single fiber elongation is in these ranges, the impact strength of the cured article improves and cracks are less likely to be produced in the cured article.

The use of the cured article reinforcing fibers of the present invention is not particularly limited but the fibers are generally used as short cut fibers having a fiber length of 3 to 30 mm. The cured article reinforcing fibers may be made into multifilaments or monofilaments, and used in the form of a net made of the multifilaments or monofilaments.

It is preferable that the affinity of the cured article reinforcing fibers of the present invention for hardening materials is improved by blending inorganic particles into the thermoplastic resin(s), blending a hydrophilizing agent into the thermoplastic resin(s), blending modified polyolefin having a polar group into the thermoplastic resin(s), or adhering a surfactant onto the fiber surface. Examples of inorganic materials that can be blended into the thermoplastic resin(s) include oxides, carbonates, or sulfates of at least one element selected from the group consisting of silicon, aluminum, calcium, magnesium, sodium, and potassium. Taking into consideration the fibers' affinity for hardening materials, these inorganic materials are preferably exposed on the fiber surface. When the fibers are core-sheath composite fibers, the inorganic materials are suitably blended into the thermoplastic resin forming the sheath component. The amount of the inorganic particles blended into the sheath component is preferably 0.1 to 40 mass %, and more preferably 1 to 20 mass % with respect to 100 mass % of the sheath component. The inorganic particles have an average particle size of preferably 0.1 to 10 µm, more preferably 0.2 to 5 µm, and still more preferably 0.3 to 2 µm. When the inorganic particles have an average particle size of 0.1 µm or more, convex parts are formed on the fiber surface, which makes the effect of causing the fibers to be hardly removable from a cured article more remarkable. When the inorganic particles have an average particle size of 10 µm or less, the fibers can be prevented from breaking up in the spinning process and the inorganic particles become resistant to falling from the fiber surface of resulting fibers. The average particle size of the inorganic particles is measured using a particle size distribution meter (trade name: SALD-2000, manufactured by Shimazu Corporation). The hydrophilizing agent is not particularly limited as long as it is a compound having a hydrophilic group such as a hydroxyl group, a carbonyl group, a carboxyl group, a sulfonic group or the like. Examples of such compounds include fatty acid glyceride (monoglycerol fatty acid ester), polyglycerol fatty acid ester, alkoxylated alkyl phenol, polyoxyalkylene fatty acid ester, and fatty acid diethanolamide. The hydrophilizing agent, modified polyolefin having a polar group or the like may be blended into the thermoplastic resin within a range such that they do not significantly impair the strength of the fibers. When producing the composite fibers by blending inorganic particles, a hydrophilizing agent, modified polyolefin having a polar group or the like into the above-mentioned thermoplastic resin, it is preferable to blend it into the thermoplastic resin for the sheath component of the composite fibers, and the composite ratio between the core component and the sheath component (core component/sheath component) is 2/8 to 9/1, and preferably 7/3 to 9/1. In this case, it is preferable that the core component resin is of the same type as the sheath component resin. This is because a decrease in fiber strength can be reduced and the fibers' affinity for hardening materials can be improved. A surfactant typically used for the purpose of improving hydrophilicity can be used as the surfactant without any problem, and examples of such surfactants include phosphate surfactants such as alkyl phosphates, for example, octyl alkyl phosphate, decyl alkyl phosphate, lauryl alkyl phosphate, tridecyl alkyl phosphate, myristyl alkyl phosphate, cetyl alkyl phosphate, and stearyl alkyl phosphate or metal salts such as sodium salts and potassium salts thereof.

Further, the cured article reinforcing fibers of the present invention may be subjected to a hydrophilization treatment to improve the fibers' affinity for hardening materials. Examples of hydrophilization treatments include a fluorine gas treatment, a plasma discharge treatment, and a corona discharge treatment. When subjecting the fibers to a corona discharge treatment, the discharge amount per treatment is preferably 50 W/m$^2$/min or more, and the total discharge amount is preferably 100 to 5000 W/m²/min, and more preferably 250 to 5000 W/m²/min. When subjecting the fibers to a plasma treatment, the treatment is preferably, but is not limited to, an atmospheric plasma treatment, and it is suitable that the fibers are subjected to the treatment at a voltage of 50 to 250 kV and frequency of 500 to 3000 pps. An atmospheric plasma treatment is preferred because it is possible to treat the fibers at a low voltage, which results in less fiber deterioration. Further, a fluorine gas treatment can be performed using, but not particularly limited to, a mixed gas of fluorine gas and oxygen gas or a mixed gas of fluorine gas and sulfurous acid gas.

The cured article reinforcing fibers of the present invention can be produced in the following procedural steps. First, by using one of or two or more of the aforementioned thermoplastic resins and a single or composite type nozzle for forming fibers in a certain shape, the resin(s) is melt spun at a resin melting temperature, for example, at a spinning temperature of 200 to 350° C. when using polypropylene, and are taken up at a take-up speed of 100 to 1500 m/min, thus obtaining spun filaments. Further, inorganic particles or the like are blended into the thermoplastic resin(s), preferably the thermoplastic resin for the sheath component as needed.

Next, the spun filaments are drawn as needed. The drawing temperature is set appropriately based on the types of thermoplastic resin used. For example, when using a polypropylene thermoplastic resin, it is preferable to draw the spun filaments at a drawing temperature of preferably 80 to 160° C., and more preferably 110 to 155° C., and a draw ratio of 1.5 to 8, and more preferably 3 to 6. A known drawing method can be used for the drawing, and examples of such known drawing methods include, but are not particularly limited to, wet drawing in which drawing is performed by heating filaments with a hot liquid such as hot water heated to a high temperature, dry drawing in which drawing is performed by heating filaments in a high temperature gas or with a high temperature metal roll or the like, or water vapor drawing in which drawing is performed by heating filaments in a state in which water vapor at a temperature of 100° C. or higher is used at normal pressure or is pressurized. The drawing process may be a single-step drawing process, or a so-called multistep drawing process in which drawing is performed step by step. A fiber treating agent such as a surfactant is applied to resulting drawn filaments as needed. Then, the filaments are subjected to a crumpling treatment as needed, and they are cut into a certain fiber length.

EXAMPLES

Hereinafter, the present invention will be described in detail by way of Examples. It should be noted that the strength and elongation and bending strength of resulting cured article reinforcing fibers were measured as follows.

[Strength and Elongation]
The strength and elongation were measured in accordance with JIS L 1015.

[Bending Strength]
The bending strength was measured in accordance with JIS A 1408.

Primary bending strength (LOP (Limit of Proportionality): kg/cm²): the highest strength in ascending of the S-S (stress-strain) curve Secondary bending strength (MOR (Modulus of Rapture): kg/cm²): the highest strength in the S-S curve other than LOP

[Relative MOR]
Relative MOR was obtained by dividing the modulus of rupture (MOR) by the density.

Example 1

A polypropylene resin (manufactured by Japan Polypropylene Corporation; trade name: SA01A) was prepared. The resin was melt-extruded from a spinning nozzle having tetralobal nozzle holes at a spinning temperature of 270° C., and the extruded resin was taken up at a take-up speed of 839 m/min, thus obtaining spun filaments (undrawn fiber) having a fineness of 4 dtex. The resulting spun filaments were dry drawn at a draw ratio of 3.6 at 150° C., and then potassium salt of C-12 alkyl phosphate, a fiber finishing agent (surfactant), was adhered to the filaments in an amount of 1.0 mass %. Subsequently, the filaments were cut into a fiber length of 6 mm, thus obtaining cured article reinforcing fibers of the present invention having a fineness of 1.2 dtex.

The resulting fibers had a multilobal cross section with four projections, and the end part of each projection was substantially curved and the base part situated toward the center of the fiber had a width smaller than the largest width of the end part. The largest width A of the end part of each projection was 6.8 μm, the width B of the base part of each projection was 4.8 μm, A/B was 1.42, the length C of each projection (the distance between the center of the base part and the tip of each projection) was 6.5 μm, and C/B was 1.35. Since the projections were deformed from the base part, the distance between adjacent projections was random, and some fibers had partially peeled projection base parts.

Example 2

Cured article reinforcing fibers of the present invention having a fineness of 2.2 dtex were obtained in the same manner as in Example 1 except for changing the fineness of spun filaments (undrawn fiber) to 7.7 dtex and the drawing temperature to 155° C.

The resulting fibers had a multilobal cross section with four projections, and the end part of each projection was substantially curved and the base part situated toward the center of the fiber had a width smaller than the largest width of the end part. The largest width A of the end part of each projection was 9.3 μm, the width B of the base part of each projection was 5.8 μm, A/B was 1.60, the length C of each projection (the distance between the center of the base part and the tip of each projection) was 12 μm, and C/B was 2.07. Since the projections were deformed from the base part, the distance between adjacent projections was random, and some fibers had partially peeled and partially fibrilized projection base parts.

Example 3

Cured article reinforcing fibers of the present invention having a fineness of 5 dtex were obtained in the same manner as in Example 2 except that the fineness of spun filaments (undrawn fiber) was changed to 17.3 dtex and the filaments were drawn at a draw ratio of 3.8.

The resulting fibers had a multilobal cross section with four projections, and the end part of each projection was substantially curved and the base part situated toward the center of the fiber had a width smaller than the largest width of the end part. The largest width A of the end part of each projection was 12.1 μm, the width B of the base part of each projection was 6.3 μm, A/B was 1.92, the length C of each projection (the distance between the center of the base part and the tip of each projection) was 16 µm, and C/B was 2.54. Since the projections were deformed from the base part, the distance between adjacent projections was random, and some fibers had partially peeled projection base parts.

Example 4

A polypropylene resin (manufactured by Japan Polypropylene Corporation; trade name: SA01A) was prepared. The resin was melt-extruded from a spinning nozzle having tetralobal nozzle holes at a spinning temperature of 270° C., and the extruded resin was taken up at a take-up speed of 428 m/min, thus obtaining spun filaments (undrawn fiber) having a fineness of 7.8 dtex. The resulting spun filaments were dry drawn at a draw ratio of 4.4 at 155° C. Through the use of a corona discharge treatment machine, the resulting drawn filaments were subjected to a corona discharge treatment at a discharge amount of 0.5 kW/m²/min for hydrophilization. Next, as a fiber finishing agent (surfactant), a phosphate ester surfactant having higher affinity for cement than the one used in Example 1 was adhered to the filaments in an amount of 1.0 mass %, and then the filaments were cut into a fiber length of 6 mm, thus obtaining cured article reinforcing fibers of the present invention having a fineness of 2.2 dtex.

The resulting fibers had a multilobal cross section with four projections, and the end part of each projection was substantially curved and the base part situated toward the center of the fiber had a width smaller than the largest width of the end part. The largest width A of the end part of each projection was 8.7 µm, the width B of the base part of each projection was 4.5 µm, A/B was 1.93, the length C of each projection (the distance between the center of the base part and the tip of each projection) was 11 µm, and C/B was 2.44. Since the projections were deformed from the base part, the distance between adjacent projections was random, and some fibers had partially peeled projection base parts.

Example 5

As a core component resin and a sheath component resin, a polypropylene resin (manufactured by Japan Polypropylene Corporation; trade name: SA01A) was prepared, and calcium carbonate particles (average particle size: 0.57 µm) were blended into the sheath component resin. The resins were melt-extruded from a spinning nozzle having tetralobal nozzle holes at a core-sheath ratio (core:sheath) of 8:2 and a spinning temperature of 270° C., and the extruded resins were taken up at a take-up speed of 428 m/min, thus obtaining spun filaments (undrawn fiber) having a fineness of 7.8 dtex, in which 6 mass % of calcium carbonate particles were blended only into the sheath component (1.2 mass % with respect to 100 mass % of polypropylene fiber). The resulting spun filaments were drawn, subjected to a corona treatment, provided with a fiber finishing agent, and cut in the same manner as in Example 4, thus obtaining cured article reinforcing fibers of the present invention having a fineness of 2.2 dtex.

The resulting fibers had a multilobal cross section with four projections, and the end part of each projection was substantially curved and the base part situated toward the center of the fiber had a width smaller than the largest width of the end part. The largest width A of the end part of each projection was 8 µm, the width B of the base part of each projection was 4.5 µm, A/B was 1.78, the length C of each projection (the distance between the center of the base part and the tip of each projection) was 10.7 µm, and C/B was 2.38. Since the projections were deformed from the base part, the distance between adjacent projections was random, and some fibers had partially peeled projection base parts.

Comparative Example 1

Polypropylene fibers having a Y-shaped cross section and a fineness of 2.2 dtex were obtained in the same manner as in Example 2 except for using a spinning nozzle having Y-shaped nozzle holes. The resulting fibers had a Y-shaped cross section with three projections, and each projection was tapered from the base part to the end part.

Comparative Example 2

Polypropylene fibers having a circular cross section and a fineness of 1.1 dtex were obtained in the same manner as in Example 1 except for using a spinning nozzle having circular nozzle holes.

[Production of Cured Cement Article]

The fibers of Examples 1 to 5 and Comparative Examples 1 to 2 in an amount of 1.5 g (0.3 mass %) were each mixed with concrete prepared by mixing 400 g of cement, 100 g of aggregate (cement:aggregate (mass ratio)=4:1) and 5 g of pulp. Each concrete was mixed with water at a mass ratio of 1:9, and a resulting mixture was kneaded. Then, after being poured into a mold, the mixture was cured by dehydration and further cured naturally for 28 days. Table 1 shows the results of measuring the bending strength of each resulting cured article.

TABLE 1

|  | Examples | | | | | Comparative Examples | |
| --- | --- | --- | --- | --- | --- | --- | --- |
|  | 1 | 2 | 3 | 4 | 5 | 1 | 2 |
| Largest width of projection end part (A) | 6.8 | 9.3 | 12.1 | 8.7 | 8 | — | — |
| Width of base part (B) | 4.8 | 5.8 | 6.3 | 4.5 | 4.5 | — | — |
| A/B | 1.42 | 1.60 | 1.92 | 1.93 | 1.78 | — | — |
| Projection length (C) | 6.5 | 12 | 16 | 11 | 10.7 | — | — |
| C/B | 1.35 | 2.07 | 2.54 | 2.44 | 2.38 | — | — |
| Fineness (dtex) | 1.2 | 2.2 | 5.0 | 2.2 | 2.2 | 2.2 | 1.1 |
| Strength (cN/dtex) | 7.9 | 8.4 | 5.8 | 8.2 | 8.3 | 8.5 | 8.9 |
| Elongation (%) | 28 | 34 | 54 | 27 | 27 | 30 | 25 |
| Density (g/cm³) | 1.69 | 1.69 | 1.73 | 1.81 | 1.83 | 1.67 | 1.64 |
| Bending LOP (kg/cm²) | 53.77 | 68.69 | 67.69 | 57.30 | 53.60 | 65.24 | 48.37 |
| Bending MOR (kg/cm²) | 27.4 | 24.1 | 13.9 | 48.0 | 32.2 | 18.8 | 17.98 |
| Relative MOR | 16.2 | 14.3 | 8.0 | 26.5 | 17.6 | 11.3 | 11.0 |

LOP relates to the modulus of rupture in bending of cement products such as cement plates. The higher the LOP, the less likely that cracks are produced. And the higher the MOR, the larger the toughness is, so that a product having high MOR is resistant to breakage. The cured cement articles using the fibers of Examples had large bending strength (LOP, MOR) and relative MOR. In particular, their MOR and relative MOR were larger than those of the cured cement articles using the fibers of Comparative Examples, showing that they had high toughness against bending. Therefore, it was determined that the fibers of Examples were able to be physically bonded to or come into engagement with the hardening material in a favorable manner. Further, as a result of observing the cross sections of the cured cement articles containing the fibers of Examples 1 to 5, it was found that the distance between adjacent projections was random due to deformations of the projections of the fibers from the base, and cement was bonded to or in engagement with portions between the projections (constricted portions).

INDUSTRIAL APPLICABILITY

Since the cured article reinforcing fibers of the present invention have high bending strength, they can be mixed with a hardening material, for example, a hydraulic material such as concrete, mortar, or cement paste that hardens by hydration, to form a cured article.

The invention claimed is:

1. A reinforcing fiber for a hydraulically cured article having a multilobal shape with three or more projections in a cross section,
    wherein each of the projections has a substantially curved end part,
    a base part situated toward a center of the fiber has a width (B) smaller than a largest width (A) of the end part, wherein a ratio (A:B) between the largest width (A) of the end part and the width (B) of the base part of each of the projections is in a range from 1.3:1 to 1.93:1,
    a length (C) of the projection is in a range from 3 to 50 μm, wherein the length (C) of the projection is a distance between a center of the base part and a tip of each projection,
    a fineness of the reinforcing fiber for a hydraulically cured article is in a range from 0.5 to 30 dtex,
    the largest width (A) of the end part of each of the projections is in a range from 3 to 20 μm,
    the width (B) of the base part of each of the projections is in a range from 0.5 to 20 μm, and
    a single fiber elongation of the reinforcing fiber is in range from 20 to 40% measured in accordance with JIS L 1015.

2. The reinforcing fiber for a hydraulically cured article according to claim 1, wherein the projections are continuous along a length direction of the fiber.

3. The reinforcing fiber for a hydraulically cured article according to claim 1, wherein distance between adjacent projections in the cross section is random due to deformations of the projections.

4. The reinforcing fiber for a hydraulically cured article according to claim 1,
    wherein the base part of the projection is partially peeled away or the projection is fibrilized from the base part in the cross section.

5. The reinforcing fiber for a hydraulically cured article according to claim 1,
    wherein the reinforcing fiber for a hydraulically cured article is hydrophilized through at least one hydrophilization treatment selected from the group consisting of a fluorine gas treatment, a plasma discharge treatment, and a corona discharge treatment.

6. The reinforcing fiber for a hydraulically cured article according to claim 1,
    wherein the reinforcing fiber for a hydraulically cured article is a core-sheath composite fiber, and
    a sheath component of the core-sheath composite fiber comprises inorganic particles.

7. A hydraulically cured article comprising:
    a mixture of reinforcing fibers for a hydraulically cured article; and
    a hydraulically hardening material,
    wherein the hydraulically hardening material has been cured,
    each of the reinforcing fibers for a hydraulically cured article has a multilobal shape with three or more projections in a cross section,
    each of the projections has a substantially curved end part,
    a base part situated toward a center of the fiber has a width (B) smaller than a largest width (A) of the end part, wherein a ratio (A:B) between the largest width (A) of the end part and the width (B) of the base part of each of the projections is in a range from 1.3:1 to 1.93:1,
    a length (C) of the projection is in a range from 3 to 50 μm, wherein the length (C) of the projection is a distance between a center of the base part and a tip of each projection,
    a fineness of the reinforcing fiber for a hydraulically cured article is in a range from 0.5 to 30 dtex,
    the largest width (A) of the end part of each of the projections is in a range from 3 to 20 μm,
    the width (B) of the base part of each of the projections is in a range from 0.5 to 20 μm,
    a single fiber elongation of the reinforcing fiber is in a range from 20 to 40% measured in accordance with JIS L 1015, and
    the hydraulically hardening material is taken into portions between adjacent projections of the reinforcing fiber.

8. The reinforcing fiber for a hydraulically cured article according to claim 1, wherein the ratio (C:B) between the projection length (C) and the width (B) of the base part is in a range from 1:1 to 4:1.

9. The reinforcing fiber for a hydraulically cured article according to claim 1, wherein a largest distance between adjacent projections, which is a largest width of each constricted portion formed of the adjacent projections, in the cross section is random in a range from 1 to 20 μm.

10. The hydraulically cured article according to claim 7, wherein a distance between the adjacent projections in the cross section of the reinforcing fiber is random due to deformations of the projections.

11. The hydraulically cured article according to claim 7, wherein the base part of the projection is partially peeled away or the projection is fibrilized from the base part in the cross section of the reinforcing fiber.

* * * * *